Figure 7:
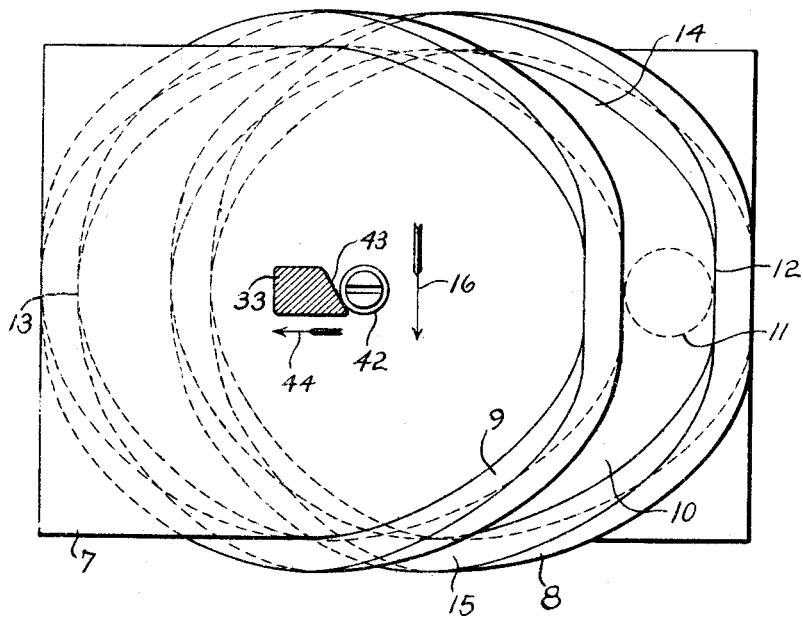

B. M. W. HANSON.
MILLING MACHINE.
APPLICATION FILED NOV. 18, 1915.
1,187,730.
Patented June 20, 1916.
3 SHEETS—SHEET 1.
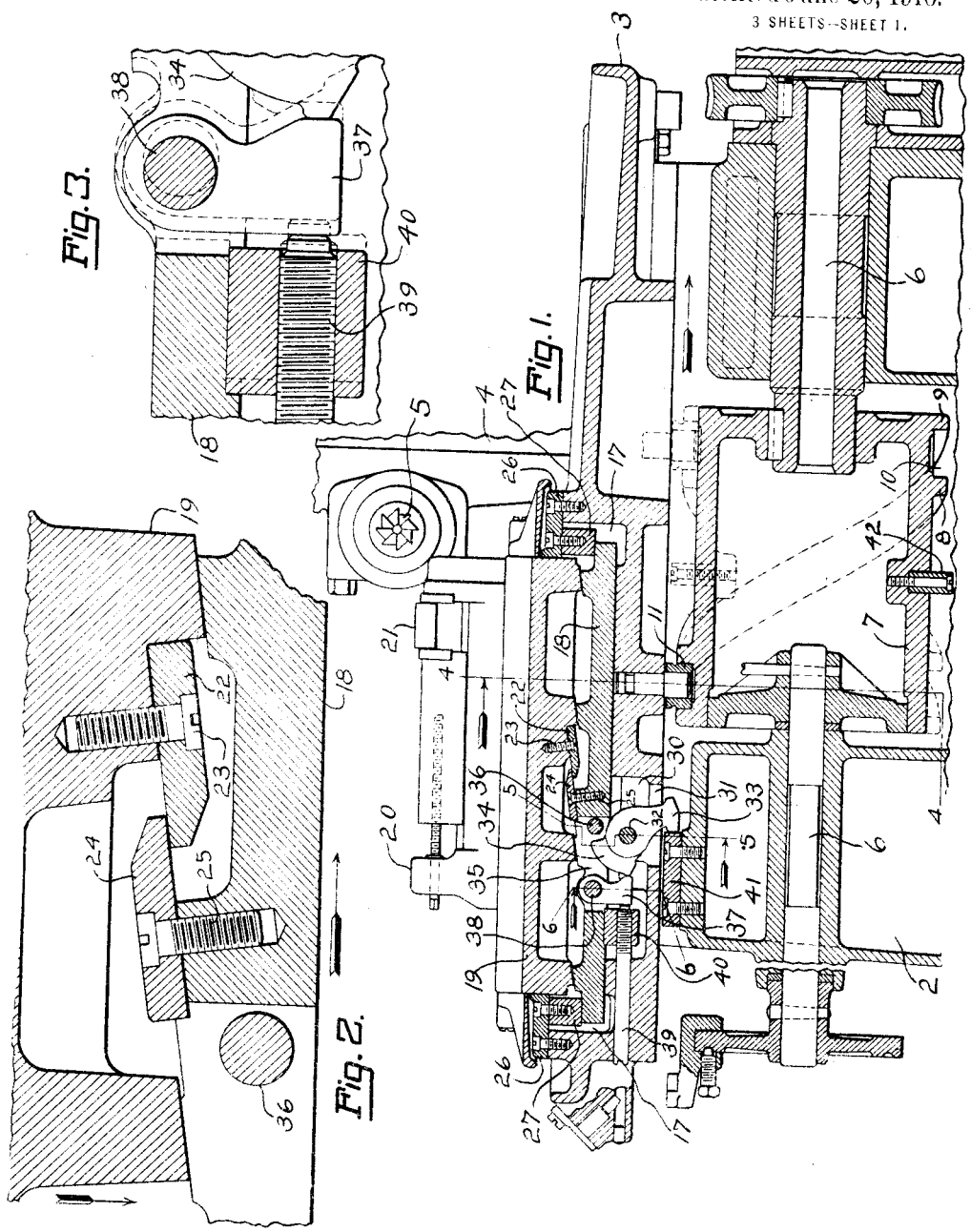
Inventor
B. M. W. Hanson
By Huth Sutherland
Attorney C. M. W. HANSON.
MILLING MACHINE.
APPLICATION FILED NOV. 18, 1915.
1,187,730.
Patented June 20, 1916.
2 SHEETS—SHEET 2.
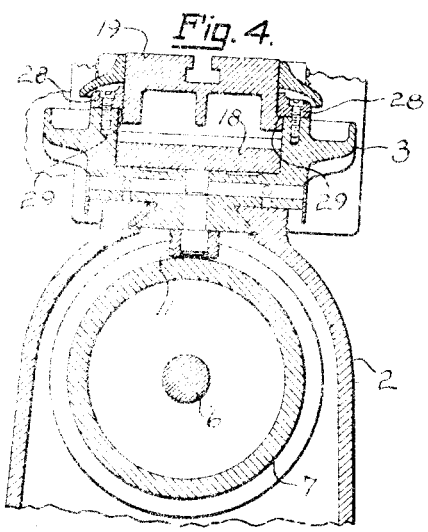
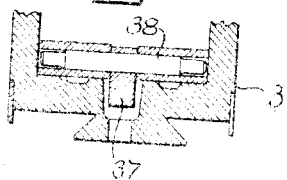
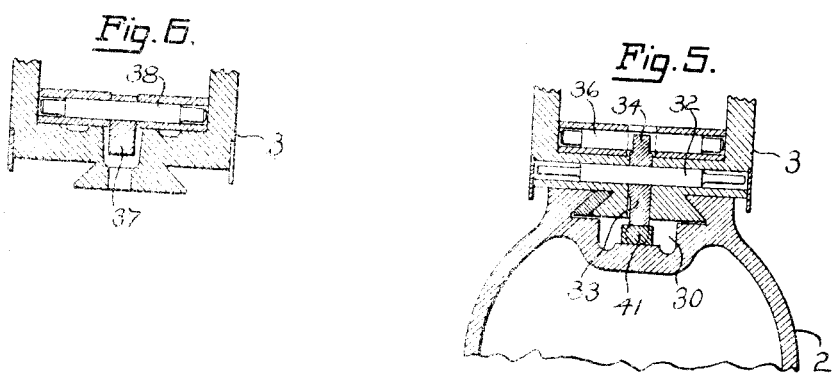

B. M. W. HANSON.
MILLING MACHINE.
APPLICATION FILED NOV. 18, 1915.

1,187,730.

Patented June 20, 1916.
3 SHEETS—SHEET 3.

B. M. W. Hanson, Inventor
By Heath Sutherland, Attorney

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

MILLING-MACHINE.

1,187,730.  Specification of Letters Patent.  Patented June 20, 1916.

Application filed November 18, 1915. Serial No. 62,208.

*To all whom it may concern:*

Be it known that I, BENGT M. W. HANSON, a citizen of the United States, residing at Hartford, in the county of Hartford and State of Connecticut, have invented certain new and useful Improvements in Milling-Machines, of which the following is a specification.

This invention relates to what I shall for convenience term a milling machine. As noted I have selected the title in question as a matter of convenience and for the reason that some or all of the features of the invention can with advantage be incorporated in other kinds of metal working machines.

In my contemporaneously pending application, Serial No. 865,856, filed October 9, 1914, I have represented a metal working machine having a reciprocatory carriage, in the form of a slide, adapted to support work and means for supporting a tool in operative relation with the work, the construction being such that at the conclusion of a cut the work up to that time in elevated relation is automatically lowered so that as the carriage or slide is moved backward the work cannot come into contact with the tool. The lowered relation of the work is maintained until before a second cut is to be made at which time the work is moved into position to be acted upon by the tool as the carriage advances, and this particular condition ensues until as intimated the second cut is finished. In the prior application there are, as will be inferred, certain broad relations, and while the form of embodiment of machine disclosed in said application is highly advantageous, the present machine has been designed to meet certain requirements. In the prior application both movements of the work with respect to the tool were governed by the motion of the carriage or slide. The present machine comprises all the advantages of that set forth in said prior application, but in the present case I provide means independent of the carriage or of the motion thereof for effecting automatically the receding of the work or its movement away from the tool at the finish of a tooling operation. I may, and prefer to have the advance or elevation of the work toward the cutting plane shall be under the control of the carriage, although this may not in all cases be necessary as will be obvious.

In the drawings accompanying and forming part of the present specification I have shown one form of embodiment of the invention which I will fully set forth in the following description. I do not restrict myself to this particular disclosure; I may depart therefrom in several respects within the scope of the invention defined by the claims following said description.

Figure 8:
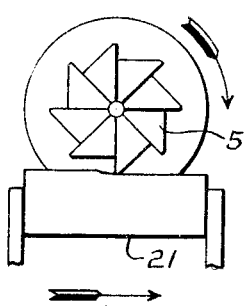
Figure 9:
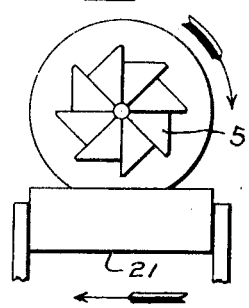

Referring to said drawings: Figure 1 is a longitudinal section partly in elevation of a milling machine involving my invention. Fig. 2 is a sectional detail of the engaging portion of the wedge members. Fig. 3 is a like view of the lower wedge, a portion of the carriage and means for effecting the elevation of said wedge member, certain of the parts being shown in different positions by full and dotted lines respectively. Fig. 4 is a transverse section on the line 4—4 of Fig. 1, looking in the direction of the arrow. Figs. 5 and 6 are transverse sections on the lines 5—5 and 6—6 respectively of Fig. 1, also looking in the direction of the arrows. Fig. 7 is a top plan view of a cam drum, the stud of the carriage being shown in dotted lines. This view also illustrates in section part of a lever carried by the main slide and the stud which coacts therewith. Figs. 8 and 9 are detail views of the cutter and work showing by arrows the motion of the parts and the work in its advanced and retracted positions.

Like characters refer to like parts throughout the several views, which are on different scales.

The different parts of the machine may be supported by any suitable framing, the base or bed 2 being shown for this purpose. In the upper side of said base or bed are ways to receive for sliding movement the carriage or slide 3 which advances toward the right in Fig. 1 and retracts toward the left in said view. The base also carries the support 4 for a cutter as 5 which may be rotated in any desirable manner.

The foregoing is a concise description of a familiar type of milling machine. As will be inferred, my improvements can be incorporated in machines of this kind or in others.

Below the carriage or slide 3 is the divided shaft 6 which may be rotated in any desirable manner and which has fixed to it for rotation therewith the drum 7 having on its periphery (Fig. 7) complemental cam strips 8 and 9, the groove 10 between which receives the stud 11 depending from the carriage or slide 3. The groove 10 has at its front end the ineffective or dwell portion 12, the function of which will be hereinafter explained, while the groove has an ineffective or dwell portion 13 at the rear end of the drum 7, the purpose of the last mentioned dwell being to prevent sudden reverse of the carriage 3 or the too rapid advance at the conclusion of its retraction thereof. The portion 14 of the cam groove 10 is adapted by engaging the stud 11 to retract the slide 3 while the complemental portion 15 is adapted to advance said slide. The dwell portion 12, it will be noted, connects the leaving end of the cam groove portion 15 and the entering end of the cam groove portion 14, the consequence being that relatively the stud 11 passes into the entering end of the dwell portion 12 at the conclusion of the advance movement of said slide and remains in said dwell portion 12 until the carriage should be returned, at which time the stud 11 relatively passes into the slide retracting portion 14 of the cam groove. It will, therefore, be clear that although the cam drum 7 is turning it does not impart any motion to the slide 3, while the stud 11 is in the dwell or ineffective portion 12. The arrow 16 in Fig. 7 indicates the direction of rotation of the cam drum 7.

Referring now to Fig. 1 it will be noted that the carriage or slide 3 has in its upper side thereof the chamber 17 against the bottom of which the wedge member 18 fits, the flattened under surface of said wedge member in the present instance sliding against the flat portion of the bottom of the chamber in the direction of the length of the carriage. It will be noted that the ends of the wedge member 18 are separated from the ends of the chamber 17 a distance sufficient to permit the requisite longitudinal movement of said wedge member. Engaging the wedge surface of the wedge member 18 is a conforming wedge member 19 which as represented has a vise as 20 rigidly fastened thereto and which clamps the work as 21. It will be clear that if the wedge member 18 is moved toward the right in Fig. 2 its wedge surface acting against the corresponding surface of the wedge member 19 will lower the latter and therefore the work 21 so as to carry that part of the work which is to be milled or otherwise operated upon slightly across the cutting plane, so that if the carriage 3 be advanced with the work elevated, the milling tool 5 can act upon the work. This elevation of the work is accomplished as will hereinafter appear practically when the carriage 3 has completed its back stroke. It will be clear that if the wedge member 18 be moved toward the right in Fig. 2 or in the direction of the arrow associated therewith, the upper wedge member 19 will be caused to lower so as to effect recession of the work or its movement below the cutting plane. This particular action occurs virtually at the conclusion of a cut. I might rely upon gravity to secure the lowering of the upper wedge member 19, but I prefer to not wholly do this, but I provide means to positively pull the wedge member 19 downward. As illustrated the upper wedge member 19 is provided on its under side with a plate 22 connected thereto by one or more screws as 23, the wedge member 18 having on its upper side a duplicate plate 24 fastened thereto by one or more screws 25. The two plates or at least their engaging surfaces are on an inclination agreeing with the angle of engagement of the bevel or wedge faces of the two wedge members. From this it will be clear that as the wedge member 18 is moved toward the right the plate 24 by riding along the plate 22 will pull down said plate 22 and therefore the wedge member 19 and work 21. The carriage 3 is provided with plates 26 which overhang the chamber 17 and which may be fastened to said carriage in any suitable manner as by screws. Attached by screws or any other convenient manner to the overhanging portions of the plates 26 are strips 27 which fit against the upper surface of the wedge member 18 at the ends thereof to thus hold down said wedge member. The ends of the upper wedge member 19 abut against these plates 26 which thereby prevent endwise movement of the upper wedge member 19 but do not prevent free vertical movement thereof. Abnormal upward movement of the upper wedge member 19 shown in its extreme elevated position in Fig. 4 is prevented by the stop pieces 28 fastened to the slide 3, overhanging the side portions of the chamber 17 and adapted to be engaged by the side ledges 29 of the said upper wedge member 19 when the latter is in its extreme upper position.

Below the chamber 17 in the slide 3 and communicating with said chamber is a cavity 30 which opens by way of a slot 31 (Fig. 1) into the under surface of said slide. Extending crosswise of the cavity or slot 30 is the shaft 32 to which is fastened the pendent lever or arm 33. Rising from and fastened to the shaft 32 is the arm 34 of practically segmental shape, the arm 34 being disposed in the longitudinal slot 35 of the lower wedge member 18. Disposed transversely of the slot 35 is an anti-friction roller 36 coöperative with the segmental arm 34. This segmental arm 34 also coacts with the arm 37 attached to and depending from the shaft 38 situated in and disposed transversely of the slot 35. The free end of the swinging arm 37 at the back is engaged by the adjusting screw 39 projecting freely through a bore extending longitudinally of the carriage or slide 3 at the rear thereof, said screw being tapped through the block 40 rigid with and depending from the lower wedge member 18. The function of this screw is to regulate the operating point of the swinging arm 37 by the segmental arm 34. Below the slide 3 I have shown the fixed element 41 attached by screws or otherwise to the base or bed 2 and constituting a suitable actuator for the lever or arm 33.

It will be assumed that the tool 5 has concluded its action upon the work 21, that the work has been lowered and that the carriage 3 is being drawn backward by the cam drum 7. Just before the carriage 3 completes its back or retractive stroke the lever 33 will strike the actuator 41 and as the backward movement is completed the lever 33 will be swung toward the right in Fig. 1 so as to effect the movement of the segmental arm 34 in the opposite direction. In the dotted lines in Fig. 3 I have shown the arm 34 just at about the time the lever 33 engages the actuator 41, so that on the final backward movement of the slide 3 the arm 34 is moved from the dotted line position in Fig. 3 to the full line position therein, assuming the full line position when the backward movement of the carriage 3 has been concluded. As the arm 34 swings from the dotted line to the full line position it rides against the arm 37 and acting as a cam thrusts said arm 37 and therefore the wedge member 18 rearward with respect to the slide 3, the motion being completed at practically the instant the back stroke of the slide 3 is finished. As the wedge member 18 moves rearward it elevates in the manner already described the wedge member 19 so as to move the work 21 to extend above the cutting plane, this relation being maintained until the predetermined cut has been made, it being clear that during the cutting action the work is non-yieldingly sustained.

As already noted, I do not rely upon the carriage 3 to effect the lowering of the work and as a consequence can complete a cut before the work is lowered. In the present case the lowering of the work is obtained through the primary agency of the cam drum 7 or by means movable therewith, the peripheral stud or projection 42 (Figs. 1 and 7 for instance) answering satisfactorily in this connection. After the work 21 has been elevated and it is shown as just in this condition in Fig. 1, the carriage 3 will be advanced by the cam drum 7 and just as the stud or anti-friction roller enters the ineffective or dwell portion 12 indicating the completion of the advance stroke of the carriage or slide 3, the stud or roller 42 will engage the cam or angular surface 43 extending transversely of the heel portion of the lever 33 and as the drum 7 continues to rotate, the carriage at this time being at rest in its extreme advanced position, the stud or anti-friction roller 11 will traverse said dwell or ineffective portion 12, and when it enters the cam portion 15 the latter by acting against the stud 11 will cause the backward movement of the said carriage or slide. Just as the stud 11 enters the dwell or ineffective portion 12, the stud or anti-friction roller 42 will engage the low end of the cam or wedge face 43 and will ride along said face 43, leaving it just about the time the stud 11 enters the cam portion 14. While the stud 11 is riding along the dwell or ineffective portion 12, the stud or actuator 42 is in engagement with the cam or wedge surface 43, thus moving the lever 33 in the direction of the arrow 44 or rearward, the arm 34 on such motion of the lever engaging the transverse member 36 made for instance in the form of an anti-friction roller and extending crosswise of the slot 35, the consequence being that as the lever 33 is moved rearward by the stud 42 and the arm 34 forward, the latter by impinging against the transverse piece 36 moves the wedge member 18 forward or toward the right in Figs. 1 and 2 and as indicated by the arrow in Fig. 2, whereby the upper wedge member 19 to which the work is practically directly fixed will be pulled down by the plate 24 riding along the plate 22 in the manner already described. The result is that the work 21 is lowered or caused to recede from the cutting plane just about the time the stud 11 is in readiness to enter the cam portion 14 to inaugurate the backward movement of the carriage 3.

In Fig. 8 the work 21 is supposed to be moving in the direction of the straight arrow, the tool 5 operating upon the same, the curved arrow in this view and in Fig. 9 indicating the direction of rotation of the cutter or tool. The straight arrow in Fig. 9 represents the backward movement of the work, the work at this time being below the cutting plane so that there is no possibility of the cutter injuring the work.

It is believed that the action of the machine will be clearly obvious from the foregoing description, but nevertheless it is desirable to briefly set forth the same. In Fig. 1 the carriage or slide 3 is assumed to be at practically the limit of its backward movement, the work 21 having been elevated in the manner already described, and the stud 42 being at the under side of the cam drum 7. As the cam drum rotates in the direction of the arrow in Fig. 7, the cam portion 15 acting against the stud 11 advances the carriage or slide 3 in the direction of the arrow applied thereto in Fig. 1, the stud 42 being brought up to the dotted line position in Fig. 1 and into the path of the lever 33 just at about the time the stud 11 enters the dwell or ineffective portion 12. As the cam drum 7 continues its rotation, the stud 42 in the manner already described effects through the intermediate parts the lowering of the work 21, and when the work is lowered the stud 11 enters the cam portion 14, so that the latter on the continued rotation of the drum 7 imparts the return movement to the carriage or slide 3.

What I claim is:

1. The combination of a reciprocatory slidable member, means for supporting a tool in operative relation to said slidable member, work carrying means on said slidable member, means for causing the movement of the work toward the tool relatively to the slidable member at a predetermined point in the movement of said slidable member, and means movable independently of the slidable member for causing the movement of the work away from the tool relatively to the slidable member at a different point in the travel of the latter.

2. The combination of a reciprocatory slidable member, means for reciprocating said slidable member, means for supporting a tool in operative relation to said slidable member, work carrying means on said slidable member, means for causing the movement of the work toward the tool relatively to the slidable member at a predetermined point in the travel of said slidable member, and means governed by said reciprocating means for causing the movement of the work away from the tool relatively to the slidable member at another point in the travel thereof.

3. The combination of a reciprocatory slidable member, means for supporting a tool in operative relation to said slidable member, work carrying means on said slidable member, means for causing the movement of the work toward the tool relatively to the slidable member at a predetermined point in the travel thereof, a cam for operating said slidable member, and means actuated by the cam for causing the movement of the work away from the tool at another point in the travel of said slidable member and relatively to the latter.

4. The combination of a slidable member, a cam for reciprocating said slidable member, means for supporting a tool in operative relation to the slidable member, work carrying means on the slidable member, means for causing the movement of the work toward the tool relatively to the slidable member at a predetermined point in the travel thereof, and means actuated by said cam for causing the movement of the work away from said slidable member.

5. The combination of a reciprocatory slidable member, work carrying means on the slidable member, means governed by the slidable member for causing the movement of the work toward the tool relatively to the slidable member at a predetermined point in the travel of said slidable member, and means movable independently of the slidable member for causing the movement of the work away from the tool relatively to said slidable member at another point in the travel thereof.

6. The combination of a reciprocatory slidable member, means for supporting a tool in operative relation to the slidable member, work carrying means on the slidable member, means for causing the movement of the work toward the tool relatively to the slidable member at approximately the conclusion of the retractive stroke of the slidable member, and means active independently of the motion of said slidable member for causing the movement of the work away from the tool approximately at the conclusion of the advance movement of said slidable member.

7. The combination of a reciprocatory slidable member, means for supporting a tool in operative relation to and above the slidable member, means for causing the movement of the work upward for action by the tool before the work is engaged by the tool relatively to the slidable member, and means active independently of the motion of said slidable member for causing the lowering of the work relatively to the slidable member approximately at the conclusion of the advance of said slidable member.

8. The combination of a reciprocatory slidable member, means for supporting a tool in operative relation to said slidable member, work carrying means on said slidable member, means for causing the advance movement of the work toward the tool relatively to the slidable member before the work reaches the tool and for non-yieldingly holding the work in its advanced position, and means movable independently of the slidable member for causing retractive movement of the work relatively to the slidable member at approximately the conclusion of the advance movement of said slidable member.

9. The combination of a reciprocatory slidable member, work carrying means on said slidable member, means governed by the movement of the slidable member for effecting the movement of the work away from the slidable member, and means movable independently of the slidable member for also causing movement of the work toward the slidable member at another point in the travel of the latter.

10. The combination of a reciprocatory slidable member, work carrying means on said slidable member, means on the frame work for causing movement of the work away from the slidable member at one point in the travel thereof, and means movable independently of the slidable member for causing the movement of the work toward the slidable member at a different point in the travel of the latter.

11. The combination of a reciprocatory slidable member, work carrying means on said slidable member, means for causing a movement of the work away from the slidable member at one point in the travel thereof, operating means for the slidable member, and means actuated by said operating means for causing movement of the work toward the slidable member at another point in the travel thereof.

12. The combination of a reciprocatory slidable member, work carrying means on slidable member, a cam for reciprocating the slidable member, and means actuated by the cam for causing the motion of the work transversely to the motion of the slidable member.

13. The combination of a reciprocatory slidable member, work carrying means on said slidable member, operating means for causing the movement of the slidable member, and means actuated by said operating means for causing a movement of the work transversely to the motion of the slidable member at a predetermined point in the movement thereof.

14. The combination of a reciprocatory slidable member, a rotary cam, the slidable member having a stud and the cam engaging said stud to effect the reciprocation of the slidable member, the cam having an ineffective portion to receive the stud approximately at the conclusion of the advance of the slidable member, work supporting means on the slidable member, and means actuated by the cam approximately at the conclusion of the advancing movement of the slidable member, for causing the movement of the work toward said slidable member.

15. The combination of a reciprocatory member, work carrying means on said reciprocatory member, a cutting tool positioned to act on the work on the advance of the reciprocatory member, means governed by the reciprocatory member for causing the movement of the work toward the cutting tool at a predetermined point in the movement of the reciprocatory member, and means independent of the reciprocatory member for causing a movement of the work away from the tool at another point in the travel of said reciprocatory member.

16. The combination of a reciprocatory slidable member, means for supporting a tool in operative relation to said slidable member, work carrying means on the slidable member, the tool being adapted to cut the work during a predetermined time in the advance of said slidable member, and means active independently of the motion of the slidable member, for effecting a relative separation of the tool and the work with respect to said slidable member approximately at the conclusion of a cut to permit the work and the tool to be free of each other on the backward movement of said slidable member.

17. The combination of a reciprocatory slidable member, means for supporting a tool in operative relation to said slidable member, work carrying means on the slidable member, means for holding the work in a position away from the slidable member to permit the cutting of the work on the advance of the slidable member, and means automatically movable independently of the motion of the slidable member for effecting the movement of the work toward the slidable member at approximately the conclusion of the operation of the tool upon the work to permit the slidable member to move backward with the work free of the tool.

In testimony whereof I affix my signature in presence of two witnesses.

BENGT M. W. HANSON.

Witnesses:
W. M. STORRS,
C. M. GELLERT.